3,062,802
TREATMENT OF RUBBER
John Ivan Cunneen and William Ferguson Watson, Welwyn Garden City, England, assignors to The Natural Rubber Producers' Research Association, a British body corporate
No Drawing. Filed Sept. 8, 1959, Ser. No. 838,400
20 Claims. (Cl. 260—94.7)

This invention is for improvements in or relating to the treatment of rubber and has for an object to provide a method of retarding the rate of crystallisation which ocurs at low temperatures in natural rubber and other natural and synthetic polyisoprenes and polybutadienes.

On storage at the moderately low temperatures of 0° to −40° C., both raw and vulcanised natural rubber crystallise, becoming harder and less elastic.

It is also known that the crystallisation of rubber is accelerated by stretching of the rubber and a measure of the rate of crystallisation can be obtained by stretching a standard test piece of rubber to a predetermined extent and measuring the rate of reduction in the tension necessary to maintain the test piece of rubber in its stretched condition. Although the tension in the rubber gradually reduces to zero when crystallisation is very far advanced, it is more convenient to measure the period of time at which the tension has fallen to half its initial value. Modified rubbers can then be classified by retardation ratios, that is, the ratios of their half-life periods to that of an unmodified control test piece. Since the vulcanisation of rubber has some modification on the rubber structure and causes a retardation in crystallisation, as compared with unvulcanised rubber, the tests are normally carried out on rubber vulcanised in accordance with a standard procedure.

We have previously observed that thiol acids react with rubber, particularly in the presence of a catalyst, to produce retardation ratios in excess of 100:1; the reaction with thiol acids can be carried out with the rubber in the latex form or it can be carried out on the solid rubber in a mixer or on a rubber mill.

We have found, however, that the modification of solid rubber by reaction with thiol acids in a mixer or on a rubber mill causes an undesirable softening of the rubber and also causes a premature vulcanisation of the rubber during the mixing operations to which rubber is subjected in compounding it in readiness for vulcanisation.

We have now found that we can achieve a very high retardation of the rate of crystallisation of natural or synthetic rubbers and stereospecific polybutadienes by treating them with sulphur dioxide at temperatures above 100° C. to produce a modified rubber which is substantially free from combined sulphur and which is not subject to the disadvantages noted above in relation to rubber modified with thiol acids. This treatment differs markedly from the known reaction of sulphur dioxide with unsaturated organic compounds, including polyisoprenes, at lower temperatures which, in the case of polyisoprenes is below 60° C. At these lower temperatures, the sulphur dioxide combines with polyisoprenes to form a resinous, fibre-forming material containing up to 15% by weight of combined sulphur at the completion of the reaction. In following out the process of our invention, however, the rubber is substantially unaltered in its physical properties except at low temperatures where these properties are maintained to a greater extent and the amount of sulphur combined with the rubber is, in all cases, less than 1%.

According to the present invention, therefore, there is provided a process for the modification of polybutadiene hydrocarbons which comprise treating a polyisoprene or polybutadiene rubber with sulphur dioxide at a temperature of from 100° C. to 250° C.; it is to be understood that the term "polyisoprene or polybutadiene rubber" is used herein in a generic sense to include both the natural and synthetic polyisoprenes, amongst which may be mentioned guttapercha, chicle gutta, guayule and koksaghyz as well as the various grades of natural rubber, such as smoked sheet, air-dried sheet, skim, blanket crepe, pale crepe and bleached pale crepe, as well as a wide variety of synthetic polyisoprenes, particularly those polymers made by the use of metal-alkyl compounds, transition metal salts of lithium catalysts, which synthetic polyisoprenes are at least 90% the cis or trans isomers and synthetic stereospecific polybutadienes, particularly the cis-polybutadienes although it is, of course, equally applicable to the trans-polybutadienes.

The sulphur dioxide employed in carrying out the treatment of the present invention may either be used as such or in the form of a compound which is decomposable at the temperature of the treatment to release sulphur dioxide in situ; examples of compounds which are decomposable are, for instance, clathrate compounds of sulphur dioxide with certain phenols which liberate sulphur dioxide on mixing in rubber above 100° C.; other ways in which the sulphur dioxide may be liberated in situ is by the use of sulphur dioxide in a good solvent therefor, or absorbed in solid absorbents such as carbon black, or in certain addition compounds of sulphur dioxide with inorganic salts such as barium iodide.

A feature of the invention, however, consists in the use of the sulphones of unsaturated compounds, particularly the sulphones of butadiene and isoprene.

A still further feature of the invention consists in that the rubber is heated to a temperature within the range of 130° to 200° C. The rubber may be treated in various forms, thus it may be reacted with the sulphur dioxide in solution or the rubber may be in mass form, that is to say in the form of sheet, milled or calendered unvulcanised rubber or as vulcanised rubber.

A still further feature of the invention consists in that the treatment with sulphur dioxide is effected during the mastication or compounding of the rubber. Alternatively, the treatment may be effected during the actual vulcanisation of the rubber, preferably at temperatures of 130° to 160° C. With the polybutadienes it is preferred to carry out the treatment during, or after, vulcanisation since we have found that the action of sulphur dioxide on the raw, i.e. unvulcanised, polymer tends to bring about a cross-linking between the molecules of the polybutadiene.

We have further found that the presence of free radical catalysts accelerates the reaction between the polyisoprene or polybutadiene rubber and the sulphur dioxide and accordingly, therefore, the invention further comprises the feature of effecting the treatment in the presence of the free radical catalysts, such as t-butyl hydroperoxide, t-butyl perbenzoate, benzoyl peroxide, azoisobutyronitrile, bis-cyclohexyl-azocarbonitrile, mercaptobenzthiazole and di(o-benzamidophenyl) disulphide; the most convenient catalyst is the bis-cyclohexyl-azocarbonitrile.

The amount of catalyst which may be employed varies widely with the activity of the particular catalyst but, in general, amounts of catalyst useful for carrying out the process of the present invention range from 0.1 to 5.0% by weight of the polyisoprene or polybutadiene rubber.

In order to facilitate the mixing of the polyisoprene or polybutadiene rubber with the compounds which decompose to yield sulphur dioxide, it is preferable to mix the sulphur dioxide-yielding compounds with an inert filler and, in the case of the sulphones of butadiene and isoprene, we find that convenient quantities thereof are from 1 to 5% of the sulphones by weight of the polyisoprene or polybutadiene rubber with an approximately equal amount of the inert filler; amongst the fillers which may be employed, we find that silica and carbon black appear to be the most effective, although whitings, clays and other silicates are also effective; the more absorbent fillers appear to be preferable.

We find that, in carrying out the process of the present invention, the time necessary to produce the desired effect is normally less than 30 minutes and the conditions are preferably so adjusted that the treatment is complete in less than 15 minutes.

It will be appreciated that the time required to achieve the desired effect is dependent upon the temperature of the treatment, the concentration of sulphur dioxide, and the amount and nature of the free radical catalyst employed.

We have found that the rubbers that is to say the natural and the synthetic polyisoprenes and the polybutadienes, are not substantially degraded by the treatment with the sulphur dioxide and are suitable for compounding in the same way as an untreated rubber and the properties of the treated rubber are of the same order as the untreated rubber, apart from the fact that its crystallisation rate at low temperature has been very greatly retarded. Operating in accordance with the process of the present invention, we have achieved retardation ratios better than 500:1, that is to say that the half-life period of the treated rubber has been more than 500 times greater than the half-life period of the untreated rubber.

In carrying out the assessment of the effect obtained in modifying polyisoprene rubber in accordance with the present invention, the modified polyisoprene rubber is tested in the form of a vulcanisate and the standard vulcanisation recipe used for preparing vulcanisates for the crystallisation test (except when the sulphur dioxide treatment was carried out during vulcanisation) was, by weight, 4 parts per 100 parts of rubber of tetramethylthiuram disulphide, 5 parts zinc oxide, 2 parts stearic acid, the mixture being cured for 40 minutes at 140° C.

The standard crystallisation test was to take a T-50 test-piece as described in the American Society for Testing Materials Specification No. D599/55 (no British equivalent specification) with end pieces ¼" square and central section 1½" long and .075 in. wide. The thickness of the sample was 2 mm. The T-50 test-piece was stretched at room temperature to 3.75" (150%) on a frame with the top clamp resting, under the tension of the rubber, on a stop. The top clamp was fixed for the initial and occasional measurement of stress in the rubber to one end of a spring calibrated for extension against force. The extension of the spring just to lift the clamp off the stop was recorded as measuring the stress in the rubber. The time for the rubbers to decay to half their stress at the constant extension (half-life) was on average 100 minutes with variation between samples of ±20 minutes for untreated rubber vulcanised with the above recipe. For the treated rubber it was much longer. The ratio of half-lives of the treated samples to an untreated sample is termed the retardation ratio.

Retardation ratios in excess of 300:1 are not readily reproducible and consequently, in the examples hereinafter set forth, retardation ratios in excess of 300:1 are usually quoted as, for example, "better than 300" meaning that the retardation ratio is in excess of 300 but probably less than 400.

The following examples, in which percentages are given by weight, will serve to illustrate the manner in which the process of the present invention may be carried into effect for the treatment of natural rubber:

*Example 1.*—3.3ml. of cumene hydroperoxide per 100 g. ribbed smoker sheet rubber of Grade 1 was incorporated during milling on a twin-roll mill. A strip of the masticated rubber approximately 2 mm. thick and weighing 20 g. was placed in a stoppered glass tube fitted with an inlet and outlet tube. The air in the tube was flushed out by a brisk stream of sulphur dioxide over 30 seconds. The tube was then immersed in a liquid bath at 110° C., the sulphur dioxide flow reduced to one bubble per second through a bubbler fitted to the outlet, and the tube maintained at 110° C. for 30 min.

The sulphur content of the treated rubber was less than 0.4% (as in all succeeding examples). The crystallisation retardation ratio was better than 300:1.

*Example 2.*—With the same rubber and catalyst and conditions as in Example 1 but heating for 20 min. at 135° C., a retardation ratio of better than 400:1 was obtained.

*Example 3.*—With the same rubber and catalyst conditions as in Example 1 but heating for 40 min. at 135° C., a retardation ratio of better than 400:1 was obtained.

*Example 4.*—With the same conditions as in Example 1 but using 3% benzoyl peroxide instead of cumene by hydroperoxide and heating for 40 min. at 140° C., a retardation ratio of better than 400:1 was obtained.

*Example 5.*—With the same conditions as in Example 4 but using 3% bis-azo-isobutyronitrile as catalyst, a retardation ratio of better than 500:1 was obtained.

*Example 6.*—With the same conditions as in Example 4 but with 3% diazoaminobenzene as catalist, a retardation ratio of better than 500:1 was obtained.

*Example 7.*—With the same condition as in Example 4 but with 3% bis-cyclohexyl-azo-carbonitrile as catalyst, a retardation ratio better than 500:1 was obtained.

*Example 8.*—With the same conditions as in Example 7 but treatment at 160° C. for 30 min., a retardation ratio of better than 500:1 was obtained.

*Example 9.*—200 g. rubber (of the same grade used in Example 1) containing 3% bis-azo-isobutyronitrile in sheet ⅛" thick was suspended in an oven at 140° C. The air was flushed out by sulphur dioxide and the rubber maintained 40 min. at 140° C. in the sulphur dioxide atmosphere. A retardation ratio of better than 300:1 was obtained.

*Example 10.*—Rubber of the same grade as used in Example 1 and 3% t-butyl hydroperoxide were mixed on a twin-roll mill. After placing the rubber and catalyst in an enclosed rubber mixer, a brisk stream of sulphur dioxide introduced through the inlet port flushed out the air through the outlet port and a liquid bubbler. The sulphur dioxide flow was then reduced to one bubble per second. The mixing assembly was then immersed in an oil bath at 110° C. and mixing carried out for 45 mins. The treated rubber had a retardation ratio of better than 300:1.

*Example 11.*—With the same conditions as in Example 10 but with rubber of grade "air-dried sheet" a retardation ratio of better than 400:1 was obtained.

*Example 12.*—With the same conditions as in Example 10 but with rubber of grade "pale crepe," a retardation ratio of better than 300:1 was obtained.

*Example 13.*—With the same conditions as in Example 10 but with the addition of 50 parts per hundred parts of rubber of a high abrasion furnace black, 4 tetramethylthiuram disulphide and 5 zinc oxide a retardation ratio of 24:1 was obtained.

*Example 14.*—3% cumene hydroperoxide and 3% isoprene sulphone were milled into ribbed smoked sheet rubber of grade 1 on a twin-roll mill. 8 g. of the mixture were then placed in the mixer used in Example 10. The mixing assembly was immersed at 140° C. and mixing carried out for 40 min. at 140° C. The retardation ratio obtained was better than 300:1.

*Example 15.*—With the same conditions as in Example 14 but with 3% butadiene sulphone instead of isoprene sulphone, a retardation ratio of better than 300:1 was obtained.

*Example 16.*—With the same conditions as in Example 15 but with 3% azo-bis-isobutyronitrile as catalyst instead of cumene hydroperoxide, a retardation ratio of better than 300:1 was obtained.

*Example 17.*—With the same conditions as in Example 13 but with 3% bis-cyclohexyl-azo-carbonitrile as catalyst, a retardation ratio of better than 500:1 was obtained.

*Example 18.*—400 g. of rubber (of the same grade used in Example 1) were mixed with 3% bis-cyclohexyl-azocarbonitrile, 3% butadiene sulphone and 4% of a reinforcing silica filler on a twin-roll mill. The mix was transferred to a laboratory size B Banbury mixer at 140° C. and mixed for 15 min. The treated rubber had a retardation ratio of 110:1.

*Example 19.*—400 g. rubber (of the same grade used in Example 1) were masticated in the Banbury mixer at 140° C. for 2 min., the ingredients as in Example 18 were added to the masticating rubber within 15 seconds and mastication continued for 15 min. at 140° C. The treated rubber had a retardation ratio of 120:1.

*Example 20.*—With the same conditions as in Example 18 but with 0.38% catalyst instead of 3%, a retardation ratio of 220:1 was obtained.

*Example 21.*—With the same conditions as Example 18 but treatment at 140° C. for 30 min., a retardation ratio of better than 500:1 was obtained.

*Example 22.*—With the same conditions as Example 18 but with 0.38% catalyst and treatment for 10 min., a retardation ratio of 220:1 was obtained.

*Example 23.*—400 g. of ribbed smoked sheet rubber of grade 1 were mixed with 1.5% butadiene sulphone, 0.25% of di(o-benzamidophenyl) disulphide and 2.5% of a reinforcing silica filler on a twin-roll mill. The mix was transferred to a laboratory size B Banbury mixer at 170° C. and mixed for 15 min. The treated rubber had a retardation ratio greater than 500:1.

*Example 24.*—With the same conditions as in Example 23, but with 0.25% of mercaptobenzthiazole instead of di(o-benzamidophenyl) disulphide, a retardation ratio greater than 500:1 was obtained.

*Example 25.*—With the same conditions as in Example 23, but with 0.08% of thio-β-naphthol in 0.17% of inert wax instead of di(o-benzamidophenyl) disulphide, a retardation ratio greater than 500:1 was obtained.

*Example 26.*—85 lb. of ribbed smoked sheet rubber of grade 1 was masticated for 3 min. at high speed in a hot two-speed Banbury Type 3A mixer. The rubber was transferred to a cool mill and into it there was mixed a blend of 3% of butadiene sulphone, 1.5% of bis-cyclohexyl-azocarbonitrile, and 4% of a fine silica filler. The mix was returned to the hot Banbury and masticated at low speed. The temperature rose from 130° C. to 200° C. over a period of 14 min. Mixing was continued for a further 7 min. before the rubber was dumped. The treated rubber had a retardation ratio of 66:1.

*Example 27.*—15. g. butadiene sulphones, 7.5 bis-cyclohexyl-azocarbonitrile and 40 g. of reinforcing silica filler were mixed with 100 g. of ribbed smoked sheet rubber of grade 1 on a twin-roll mill. 62.5 g. of this concentrated mixture of ingredients was milled with a further 360 g. rubber on a twin-roll mill and the final mixture mixed at 170° C. for 15 min. in a size B Banbury mixer. A retardation ratio of better than 200:1 was obtained.

*Example 28.*—62.5 g. of a concentrated mixture as in Example 27 was added to a Banbury mixer at 170° C. containing 360 g. rubber which had been pre-masticated for 2 min. The final mixture was mixed at 170° C. for a further 15 min. A retardation ratio of better than 200:1 was obtained.

*Example 29.*—10 g. of rubber of air-dried-sheet grade and 0.2% t-butyl hydroperoxide was dissolved in 500 ml. of xylene and heated to 110° C. for 30 min. with the passage of sulphur dioxide through the solution. The product was isolated by precipitation from methanol. This treatment gave crystallisation half-life of 80:1.

*Example 30.*—The rubber used was a sheet of thickness 1.3 mm. vulcanised according to the recipe used for the crystallisation test hereinbefore described. 3% of cumene hydroperoxide was incorporated in a 6 g. strip of the sheet by absorbing a benzene solution of the catalyst and then drying off the benzene. The sheet was heated for 1 hour at 140° C .in an atmosphere of sulphur dioxide in the apparatus described in Example 1. A retardation ratio of better than 500:1 was obtained.

*Example 31.*—Under conditions similar to those of Example 30 but with 3% azoisobutyronitrile instead of cumene hydroperoxide as catalyst, a retardation ratio of better than 500:1 was achieved.

*Example 32.*—Under conditions similar to Example 30 but with 3% benzoyl peroxide as catalyst instead of cumene hydroperoxide, a retardation ratio of better than 300:1 was obtained.

*Example 33.*—Under conditions similar to Example 30 but with 3% t-butyl perbenxoate as catalyst instead of cumene hydroperoxide, a retardation ratio of better than 300:1 was obtained.

*Example 34.*—With conditions similar to Example 18 but with 1% mercaptobenzthiazole instead of bis-cyclohexyl-azocarbonitrile, a retardation ratio of better than 200:1 was obtained.

*Example 35.*—With conditions similar to Example 18 but with 1% di(o-benzamidophenyl) disulphide instead of bis-cyclohexyl-azo-carbonitrile, a retardation ratio of better than 200:1 was obtained.

*Example 36.*—With reaction conditions similar to Example 18 but with no added catalyst, a retardation ratio of 10:1 was obtained.

*Example 37.*—With reaction conditions similar to Example 36 but a period of 30 minutes at 140° C., a retardation ratio of 100:1 was obtained.

*Example 38.*—400 g. of ribbed smoked sheet rubber of grade 1 were mixed with 1.5% of butadiene sulphone, 0.75% of di(o-benzamidophenyl)-disulphide and 2% of a reinforcing silica filler on a two-roll mill. The mix was transferred to a laboratory size B Banbury mixer at 170° C. and mixed for three minutes. The mix was then transferred to a steam pan at 160° C. and heated for forty minutes. The treated rubber had a retardation ratio of 8:1.

*Example 39.*—400 g. of the rubber of Example 38 were mixed with 3% of butadiene sulphone, 1.5% of bis-cyclohexyl-azocarbonitrile and 4% of a fine silica filler on a two-roll mill. The mix was masticated in a laboratory size B Banbury at 170° C. for 5 minutes, then transferred to a vacuum vessel and kept there for 30 minutes. The retardation ratio of the treated rubber was 60:1.

*Example 40.*—100 g. of ribbed smoked sheet rubber of grade 1 was mixed with 1.5% of butadiene sulphone, 0.75% of bis-cyclohexyl-azo-carbonitrile and 3% of dicumyl peroxide on a two-roll mill. A portion of the mix was heated in a press for 50 minutes at 140° C. The vulcanised rubber had a retardation ratio greater than 500:1 compared with a mix containing only rubber and 3% dicumyl peroxide similarly cured and tested.

*Example 41.*—400 g. of ribbed smoked sheet rubber of grade 1 was compounded in a laboratory size B Banbury mixer with 160 g. carbon black, added in three portions. With the last portion of the black there was mixed 6 g. of butadiene sulphone and 3 g. of bis-cyclohexyl-azo-carbonitrile. The temperature during the mixing was kept below 100° C., then, on completion of the mixing, the temperature was raised to 170° C. and the mix was masticated at this temperature for 15 minutes. The treated rubber had a retardation ratio of 10:1.

The hardness of guttapercha, as measured by the modulus at 20% and 40% extension, is due to the extent of crystallisation at room temperature. Values of the order of 50 kgm./cm.$^2$ at 20% extension place guttapercha in the class of plastic materials of which polythene is a member. The modification (by sulphur dioxide treatment) of this modulus figure to less than 5 kgm./cm.$^2$ in conjunction with high extension at break illustrates a change to a rubber-like material.

*Example 42.*—8 g. of guttapercha containing 0.5 ml. of cumene hydroperoxide was mixed for 2.75 hr. at 110° C. in a sulphur dioxide atmosphere in a mixer. The product remained as a rubbery mass on several weeks standing at 20° C. On compounding with a vulcanisation recipe of 2.5% of sulphur, 0.7% of N-cyclohexyl-benzthiazole-2-sulphenamide, 5% of zinc oxide, 1% of stearic acid, and 1% of phenyl-β-naphthylamine and curing for 25 minutes at 140° C., a vulcanisate was produced which remained as a rubber over several months at 20° C. The moduli of this rubber at 20% and 40% extension were respectively 2.5 and 4.0 kgm./cm.² A similarly compounded and vulcanised and stored vulcanisate of untreated guttapercha had corresponding moduli of 56 kgm./cm.² at both 20% and 40% extension. The extension at break of the treated guttapercha vulcanisate on extension at 1 in. per minute was 215%.

*Example 43.*—With conditions similar to those of Example 34 but with treatment of 10 g. of guttapercha containing 0.54 ml. cumene hydroperoxide at 130° C. for 30 minutes, moduli at 20% and 40% extension of 1.7 and 2.6 respectively were obtained. The extension at break was 350%.

The following description illustrates the application of the invention to the polybutadienes:

The modified cis-polybutadiene is tested in the form of a vulcanisate and the standard vulcanisation recipe used for preparing vulcanisates for the crystallisation test (except when the sulphur dioxide treatment is carried out during vulcanisation) was, by weight, 1.5 parts per 100 parts of cis polybutadiene of tetramethylthiuram disulphide, 5 parts of zinc oxide, and 2 parts of stearic acid, the mixture being cured for 40 minutes at 140°. The crystallisation test was carried out as previously described for natural rubber except that the sample was only stretched to 50%. Untreated cis polybutadiene vulcanised with the above recipe had a crystallisation half-life of 115±20 minutes.

The following examples illustrate the manner in which the invention may be carried into effect for the treatment of polybutadienes:

*Example 44.*—The cis polybutadiene used was in the form of a sheet of thickness 1.3 mm. vulcanised according to the recipe used for the crystallisation test hereinbefore described. The sheet was heated for 5 hours at 140° C. in an atmosphere of sulphur dioxide, a retardation ratio of 22:1 was obtained.

*Example 45.*—The procedure was the same as in Example 44, except that the vulcanised sheet was heated for 24 hours at 140° C., as a result of which a retardation ratio of better than 500:1 was obtained.

*Example 46.*—The procedure was the same as in Example 44, except that the vulcanised sheet was heated for 6 hours at 160° C., as a result of which a retardation ratio of better than 500:1 was obtained.

*Example 47.*—Dicumyl peroxide (1 part) and butadiene sulphone (3 parts) were incorporated into cis-polybutadiene (100 parts) on a two-roll mill. After heating in a press for 3 hours at 140° C. the vulcanisate had a retardation ratio of better than 300:1.

*Example 48.*—Dicumyl peroxide (1 part) and butadiene sulphone (6 parts) were incorporated into cis-polybutadiene (100 parts) on a two-roll mill. After heating in a press for 1 hour at 140° C. the vulcanisate had a retardation ratio of 80:1.

*Example 49.*—The procedure was the same as in Example 48 except that heating in the press was carried out for 3 hours, the vulcanisate had a retardation ratio of better than 1000:1.

It will be appreciated that Examples 44 to 46 illustrate the carrying out of the invention on a prevulcanised polybutadiene and that Examples 47 to 49 illustrate the carrying out of the invention in such a way that the sulphur dioxide treatment and the vulcanisation occur simultaneously: in Examples 47 to 49, the rate of crystallisation was evaluated with the specimen stretched on an amount of 150% instead of the 50% existing in Examples 44 to 46. In all of the foregoing examples, 44 to 49, the test was carried out at minus 26° C.

The following Examples 50 and 51 illustrate the results obtainable when the unvulcanised polybutadiene is first treated with sulphur dioxide and subsequently vulcanised.

*Example 50.*—A sheet of cis polybutadiene of 1–2 mm. thickness was heated for 1 hour at 140° C. in an atmosphere of sulphur dioxide in the manner described in Example 44. After the treatment with sulphur dioxide had been completed, the product was then vulcanised utilising the technique described immediately prior to the examples as being the standard vulcanisation: the vulcanisate had a retardation ratio of 7:1.

*Example 51.*—The procedure was the same as in Example 50, except that the heating of the thin sheet was carried out for 5 hours, after which the final vulcanisate had a retardation ratio of 35:1.

Reference to cis and trans polybutadienes are to be understood as referred to those polymers which consist of at least 85% of the respective isomers.

The process of the present invention may be carried out before, during or after vulcanisation of the polyisoprene or polybutadiene rubbers and the technique of using a master batch of natural rubber containing the sulphur dioxide-yielding compound is found to be a particularly advantageous method of operation; as previously indicated, however, it is preferred to effect the treatment of the polybutadienes during or after vulcanisation thereof. The treatment of this invention can be carried out particularly advantageously in an extrusion machine.

We claim:
1. A process for the production of modified rubbery polymers having a retardation ratio above 100:1 and a sulphur content below 1%, which process comprises treating a rubbery hydrocarbon polymer selected from the class consisting of natural and synthetic polyisoprenes and stereospecific polybutadienes, with sulphur dioxide at a temperature of from 100° C. to 250° C.
2. A process according to claim 1 wherein the sulphur dioxide is employed in the form of a compound thereof which is decomposable at the temperature of the treatment to release sulphur dioxide.
3. A process according to claim 1 wherein the sulphur dioxide is used in the form of a solution thereof.
4. A process according to claim 1 wherein the sulphur dioxide employed is absorbed on a solid absorbent.
5. A process according to claim 2 wherein the sulphur dioxide is used in the form of a sulphone of an unsaturated compound.
6. A process according to claim 5 wherein said sulphone is the sulphone of butadiene.
7. A process according to claim 5 wherein said sulphone is the sulphone of isoprene.
8. A process according to claim 1 in which the rubber is heated to a temperature in the range of 130° C. to 200° C.
9. A process according to claim 1 wherein the treatment is effected before vulcanisation of the rubbery polmer.
10. A process according to claim 1 wherein the treatment is effected during vulcanisation of the rubbery polymer.
11. A process according to claim 1 wherein the treatment is effected after vulcanisation of the rubbery polymer.
12. A process according to claim 1 wherein the treatment is effected during mastication of the rubbery polymer.
13. A process according to claim 1 wherein the treatment is effected during compounding of the rubbery polymer.

14. A process according to claim 10 wherein the combined treatment and vulcanisation is effected at a temperature of 130° C. to 160° C.

15. A process according to claim 1 wherein the treatment is effected in the presence of a free radical catalyst.

16. A process according to claim 15 wherein the catalyst is used in an amount of from 0.1 to 5% by weight.

17. A process according to claim 2 wherein the sulphur dioxide-yielding compound is admixed with an inert filler prior to admixture with the rubbery polymer.

18. A process according to claim 2 wherein the sulphur dioxide-yielding compound is admixed with an amount of the rubbery polymer to form a master batch for incorporation in the rubbery polymer to be treated.

19. A process for the production of modified rubbery polymers having a retardation ratio above 100:1 and a sulphur content below 1%, which process comprises treating stereospecific butadiene with sulphur dioxide at a temperature of from 100° C. to 250° C.

20. A process for the production of modified rubbery polymers having a retardation ratio above 100:1 and a sulphur content below 1%, which process comprises treating isoprene with sulphur dioxide at a temperature of from 100° C. to 250° C.

References Cited in the file of this patent

UNITED STATES PATENTS

| | | |
|---|---|---|
| 1,925,879 | Oenslager | Sept. 5, 1933 |
| 2,379,354 | Hilton | June 26, 1945 |
| 2,770,603 | Lynch | Nov. 13, 1956 |